(12) United States Patent
Ding et al.

(10) Patent No.: US 10,942,249 B2
(45) Date of Patent: Mar. 9, 2021

(54) METHOD AND SYSTEM FOR DETERMINING A LOCATION OF A MOBILE DEVICE

(71) Applicant: NXP B.V., Eindhoven (NL)

(72) Inventors: Jingfeng Ding, Gratwein (AT); Ghiath Al-kadi, Graz (AT); Erich Merlin, Gratkorn (AT)

(73) Assignee: NXP B.V., Eindhoven (NL)

( * ) Notice: Subject to any disclaimer, the term of this patent is extended or adjusted under 35 U.S.C. 154(b) by 353 days.

(21) Appl. No.: 15/853,038

(22) Filed: Dec. 22, 2017

(65) Prior Publication Data

US 2019/0195981 A1    Jun. 27, 2019

(51) Int. Cl.
| | | |
|---|---|---|
| *G01S 5/10* | (2006.01) | |
| *G01S 3/50* | (2006.01) | |
| *G01S 5/08* | (2006.01) | |
| *G01S 5/04* | (2006.01) | |
| *G01S 1/02* | (2010.01) | |
| *G01S 5/02* | (2010.01) | |

(52) U.S. Cl.
CPC .................. *G01S 5/10* (2013.01); *G01S 1/02* (2013.01); *G01S 3/50* (2013.01); *G01S 5/0231* (2013.01); *G01S 5/04* (2013.01); *G01S 5/08* (2013.01); *G01S 5/0242* (2013.01)

(58) Field of Classification Search
None
See application file for complete search history.

(56) References Cited

U.S. PATENT DOCUMENTS

| 8,116,350 | B1 | 2/2012 | Arndt et al. |
| 9,516,621 | B2 | 12/2016 | Bialer et al. |
| 2005/0105600 | A1 | 5/2005 | Culum et al. |
| 2015/0323642 | A1* | 11/2015 | Mutz .................. G01S 3/74 342/417 |
| 2017/0019877 | A1* | 1/2017 | Ubeda Castellanos ..... H04W 64/003 |
| 2017/0026798 | A1 | 1/2017 | Prevatt |
| 2017/0234961 | A1* | 8/2017 | Steltz .................. G01S 5/12 342/457 |

FOREIGN PATENT DOCUMENTS

| CN | 106019221 A | 10/2016 |
| CN | 106205136 A | 12/2016 |
| CN | 106352869 A | 1/2017 |
| GB | 2541265 A | 2/2017 |

* cited by examiner

*Primary Examiner* — Whitney Moore

(57) ABSTRACT

Embodiments of methods for determining a location of a mobile device, a mobile device, and a location beacon system are described. In an embodiment, a method for determining a location of a mobile device involves receiving, at a dual-antenna receiver of the mobile device, a plurality of ultra wide band (UWB) signals from a group of unsynchronized beacons having a quadrilateral formation, at the mobile device, determining angle of arrival (AoA) information from the UWB signals, and at the mobile device, calculating the location of the mobile device based on the AoA information. Other embodiments are also described.

19 Claims, 5 Drawing Sheets

METHOD AND SYSTEM FOR DETERMINING A LOCATION OF A MOBILE DEVICE

BACKGROUND

Location technologies can be used in various applications. For example, location technologies can be used for indoor navigation within parking structures, shopping malls, airports, train stations, and hospitals. Conventional location technologies typically use two-way communications between beacons or base stations and communications nodes for location determination. In addition, conventional location technologies typically require clock synchronization among beacons. However, two-way communications between beacons and communications nodes can cause high power consumption and may delay location calculations. In addition, clock synchronization among beacons can result in high power consumption and may require complicated network architecture.

SUMMARY

Embodiments of methods for determining a location of a mobile device, a mobile device, and a location beacon system are described. In an embodiment, a method for determining a location of a mobile device involves receiving, at a dual-antenna receiver of the mobile device, a plurality of ultra wide band (UWB) signals from a group of unsynchronized beacons having a quadrilateral formation, at the mobile device, determining angle of arrival (AoA) information from the UWB signals, and at the mobile device, calculating the location of the mobile device based on the AoA information. Other embodiments are also described.

In an embodiment, the group of unsynchronized beacons includes at least four beacons that are not clock synchronized.

In an embodiment, determining the AoA information from the UWB signals includes estimating an angle between each of the group of unsynchronized beacons and the mobile device.

In an embodiment, estimating the angle between each of the group of unsynchronized beacons and the mobile device includes estimating the angle between each of the group of unsynchronized beacons and the mobile device based on a difference between a time of arrival of the UWB signals at a first antenna of the dual-antenna receiver and a time of arrival of the UWB signals at a second antenna of the dual-antenna receiver.

In an embodiment, calculating the location of the mobile device based on the AoA information includes calculating the location of the mobile device based on the angles between the group of unsynchronized beacons and the mobile device.

In an embodiment, the group of unsynchronized beacons includes four beacons that are not clock synchronized, and calculating the location of the mobile device based on the AoA information includes calculating the location of the mobile device based on four angles between the group of unsynchronized beacons and the mobile device.

In an embodiment, calculating the location of the mobile device based on the AoA information includes calculating the location of the mobile device based on the angles between the group of unsynchronized beacons and the mobile device and geographical information of the group of unsynchronized beacons.

In an embodiment, the geographical information of the group of unsynchronized beacons includes distances between the unsynchronized beacons.

In an embodiment, a mobile device includes a UWB receiver configured to receive a plurality of UWB signals from a group of unsynchronized beacons having a quadrilateral formation, a processor operably connected to the dual-antenna UWB receiver and configured to determine AoA information from the UWB signals and calculate a location of the mobile device based on the AoA information.

In an embodiment, the group of unsynchronized beacons includes at least four beacons that are not clock synchronized, and wherein the processor is further configured to estimate an angle between each of the group of unsynchronized beacons and the mobile device.

In an embodiment, the dual-antenna UWB receiver includes a first antenna and a second antenna.

In an embodiment, the processor is further configured to estimate the angle between each of the group of unsynchronized beacons and the mobile device based on a difference between a time of arrival of the UWB signals at the first antenna and a time of arrival of the UWB signals at the second antenna.

In an embodiment, the processor is further configured to calculate the location of the mobile device based on the angles between the group of unsynchronized beacons and the mobile device.

In an embodiment, the group of unsynchronized beacons includes four beacons that are not clock synchronized, and wherein the processor is further configured to calculate the location of the mobile device based on four angles between the group of unsynchronized beacons and the mobile device.

In an embodiment, the processor is further configured to calculate the location of the mobile device based on the angles between the group of unsynchronized beacons and the mobile device and geographical information of the group of unsynchronized beacons.

In an embodiment, the geographical information of the group of unsynchronized beacons includes distances between the unsynchronized beacons.

In an embodiment, a method for determining a location of a mobile device involves receiving, at a group of unsynchronized beacons having a quadrilateral formation, a UWB signal from the mobile device, determining angle of arrival (AoA) information from the UWB signal, and calculating the location of the mobile device based on the AoA information.

In an embodiment, the group of unsynchronized beacons includes at least four beacons that are not clock synchronized.

In an embodiment, determining the AoA information from the UWB signals includes estimating an angle between each of the group of unsynchronized beacons and the mobile device.

In an embodiment, calculating the location of the mobile device based on the AoA information includes calculating the location of the mobile device based on the angles between the group of unsynchronized beacons and the mobile device and geographical information of the group of unsynchronized beacons.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Ultra wide band (UWB) refers to a wireless communication technology in which wireless signals are transmitted over a wide spectrum of frequency bands. In some instances, UWB devices operate in the frequency range of 3 kHz to 300 GHz.

Figure 1:
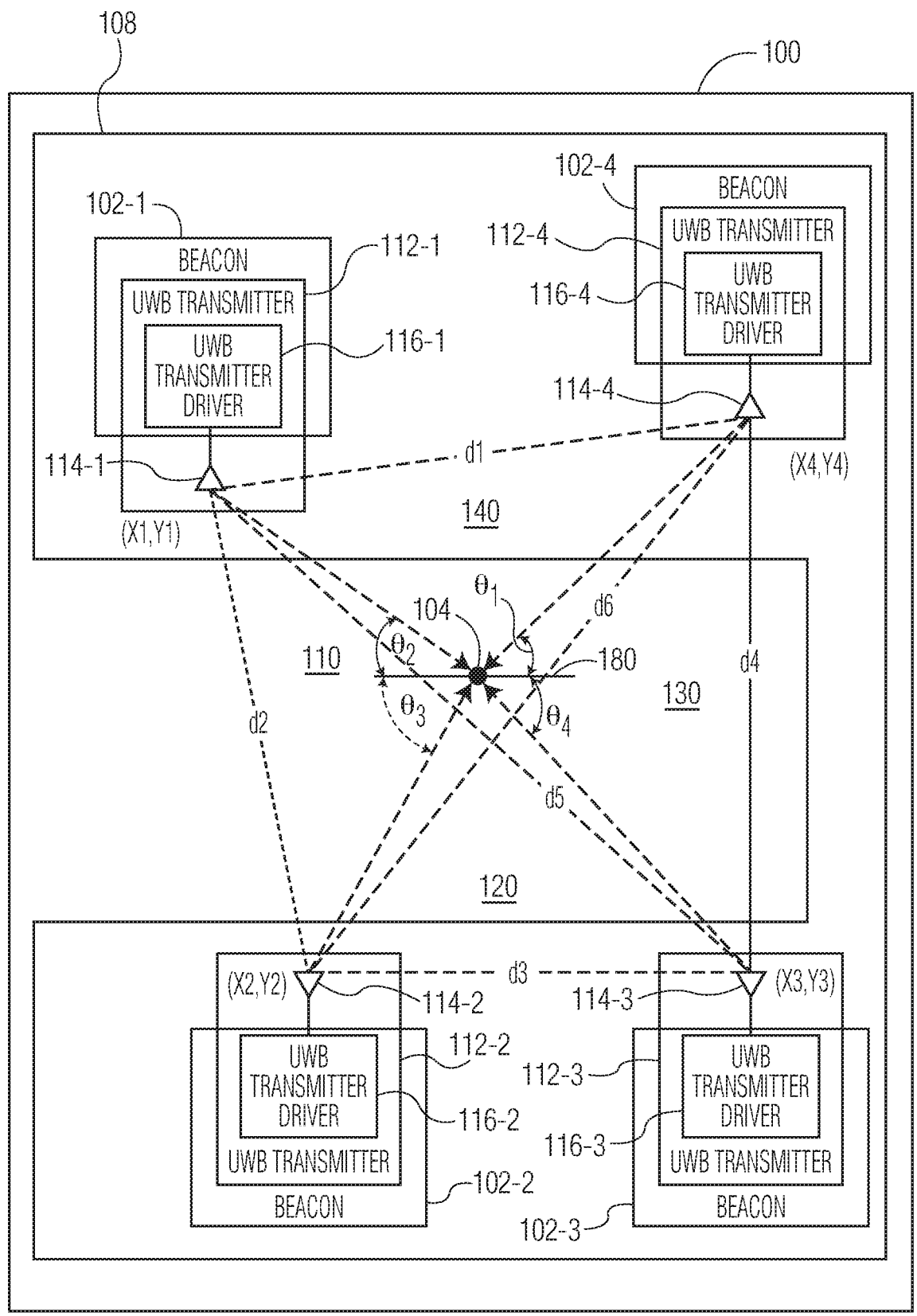
FIG. 1 depicts an embodiment of a communications system that includes a mobile device and a number of beacons having a quadrilateral formation.

FIG. 1 depicts an embodiment of a communications system 100 that includes beacons 102-1, 102-2, 102-3, 102-4 having a quadrilateral formation and a mobile device 104. In the communications system depicted in FIG. 1, the mobile device communicates with the beacons via UWB communications. The mobile device location can be determined with one-way UWB communication from the beacons based on angle of arrival (AoA) information. Although the communications system in the embodiment depicted in FIG. 1 includes four beacons 102-1, 102-2, 102-3, 102-4, in other embodiments, the communications system include more than four beacons or less than four beacons.

In the embodiment depicted in FIG. 1, the beacons 102-1, 102-2, 102-3, 102-4 form an UWB beacon mesh network 108. The beacon 102-1 includes an UWB transmitter 112-1, which includes an UWB antenna 114-1 with a coordinate (X1, Y1) and an UWB transmitter driver 116-1. The beacon 102-2 includes an UWB transmitter 112-2, which includes an UWB antenna 114-2 with a coordinate (X2, Y2) and an UWB transmitter driver 116-2. The beacon 102-3 includes an UWB transmitter 112-3, which includes an UWB antenna 114-3 with a coordinate (X3, Y3) and an UWB transmitter driver 116-3. The beacon 102-4 includes an UWB transmitter 112-4, which includes an UWB antenna 114-4 with a coordinate (X4, Y4) and an UWB transmitter driver 116-4. In the embodiment depicted in FIG. 1, the beacons are unsynchronized because the UWB beacon mesh network does not require clock synchronization among the beacons. In some embodiments, the beacons are self-calibrated such that the network infrastructure configuration of the UWB beacon mesh network is established with geographical location information of at least one of the beacons. In these embodiments, based on the quadrilateral formation of the beacons, geographical location information of other beacons can be derived from the geographical location information of the at least one of the beacons and from the triangle relationship between the beacons through using known location technology.

In the embodiment depicted in FIG. 1, the mobile device 104 is configured to determine a location of the mobile device based on UWB signals received from the UWB antennas 114-1, 114-2, 114-3, 114-4 of the unsynchronized beacons 102-1, 102-2, 102-3, 102-4. In an example operation of the mobile device, the mobile device receives UWB signals from the unsynchronized beacons, determines angle of arrival (AoA) information from the UWB signals, and calculates the location of the mobile device based on the AoA information. In some instances, the AoA information is related to an angle between a respective beacon and the mobile device relative to a reference line (e.g., a horizon line or a vertical line). The mobile device may have a wide range of mobility and portability. For example, the mobile device may be in the possession of a pedestrian, which has a pedestrian speed that is typically below 20 kilometers/hour (Km/h). In an embodiment, the mobile device is a handheld mobile device such as a cellular phone, a Smartphone, a Personal Digital Assistant (PDA), an Enterprise digital assistant (EDA), a handheld gaming device, or a wearable device. In another embodiment, the mobile device is a portable computing device such as a laptop computer, a netbook computer, or a tablet computer. In some instances, the mobile device sends its location information to one or more of the beacons, which can verify the location accuracy.

In an example operation of the communications system 100, the mobile device 104 determines its position from UWB signals from the UWB antennas 114-1, 114-2, 114-3, 114-4 of the beacons 102-1, 102-2, 102-3, 102-4 that carry geographical information related to the beacons. Specifically, the mobile device determines four angles θ1, θ2, θ3, θ4, between respective beacons and the mobile device relative to a reference horizon line 180 and calculates the location of the mobile device based on the four angles θ1, θ2, θ3, θ4. The mobile device may determine the location of the mobile device by triangulation. For example, the beacons and the mobile device form four triangles 110, 120, 130, 140. For each triangle, the locations of the two respective beacons and the distance d1, d2, d3, or d4 between the two respective beacons are known to the mobile device and the angle between the two respective beacons and the mobile device can be determined by the mobile device. In some embodiments, the mobile device uses the four triangles to determine the location of the mobile device and to calculate the average location coordinates to improve the overall location accuracy of the mobile device. In addition, a mirror problem can be dealt with or eliminated because the mobile device uses the four triangles to determine the location of the mobile device. For example, with less than four beacons, identical AoA information can be determined for two possible locations (e.g., two locations that are symmetric to two beacons) and a mirror location of the mobile device cannot be distinguished from the actual location of the mobile device. In the embodiment depicted in FIG. 1, the mobile device uses the four triangles to determine the location of the mobile device. Consequently, the AoA information of a mirror location of the mobile device is different from the AoA information of the actual location of the mobile device and the location of the mobile device can be correctly determined.

Compared to a conventional location system that requires two-way communications between beacons and a communications node, in the communications system 100 depicted in FIG. 1, the mobile device 104 determines a location based on one-way UWB communications from the four beacons 102-1, 102-2, 102-3, 102-4. Consequently, compared to a conventional location system that requires two-way communications between beacons and a communications node for location determination, the communications system 100 depicted in FIG. 1 may consume less power and may exhibit quicker location determinations than a conventional location system. In addition, compared to a conventional location system that requires clock synchronization among beacons, the communications system 100 depicted in FIG. 1 does not require clock synchronization among the beacons 102-1, 102-2, 102-3, 102-4. Because the beacons 102-1, 102-2, 102-3, 102-4 of the communications system 100 depicted in FIG. 1 are unsynchronized, the beacon network architecture in the communications system 100 is simplified and power consumption for clock synchronization among the beacons is reduced. Consequently, compared to a conventional location system that requires two-way communications between beacons and a communications node and/or requires clock synchronization among beacons, the communications system 100 depicted in FIG. 1 is power efficient and works with unsynchronized beacon arrangements, which can significantly reduce network architecture requirements and cost. Further, compared to a time of flight (TOF) based location system in which location accuracy can be affected by an intrusive object (i.e., man in the middle problem), the mobile device of the communications system 100 depicted in FIG. 1 determines its location based on angle of arrival (AoA) information. Consequently, in the communications system 100 depicted in FIG. 1, an intrusive object (i.e., man in the middle problem) does not affect the location accuracy.

Figure 2:
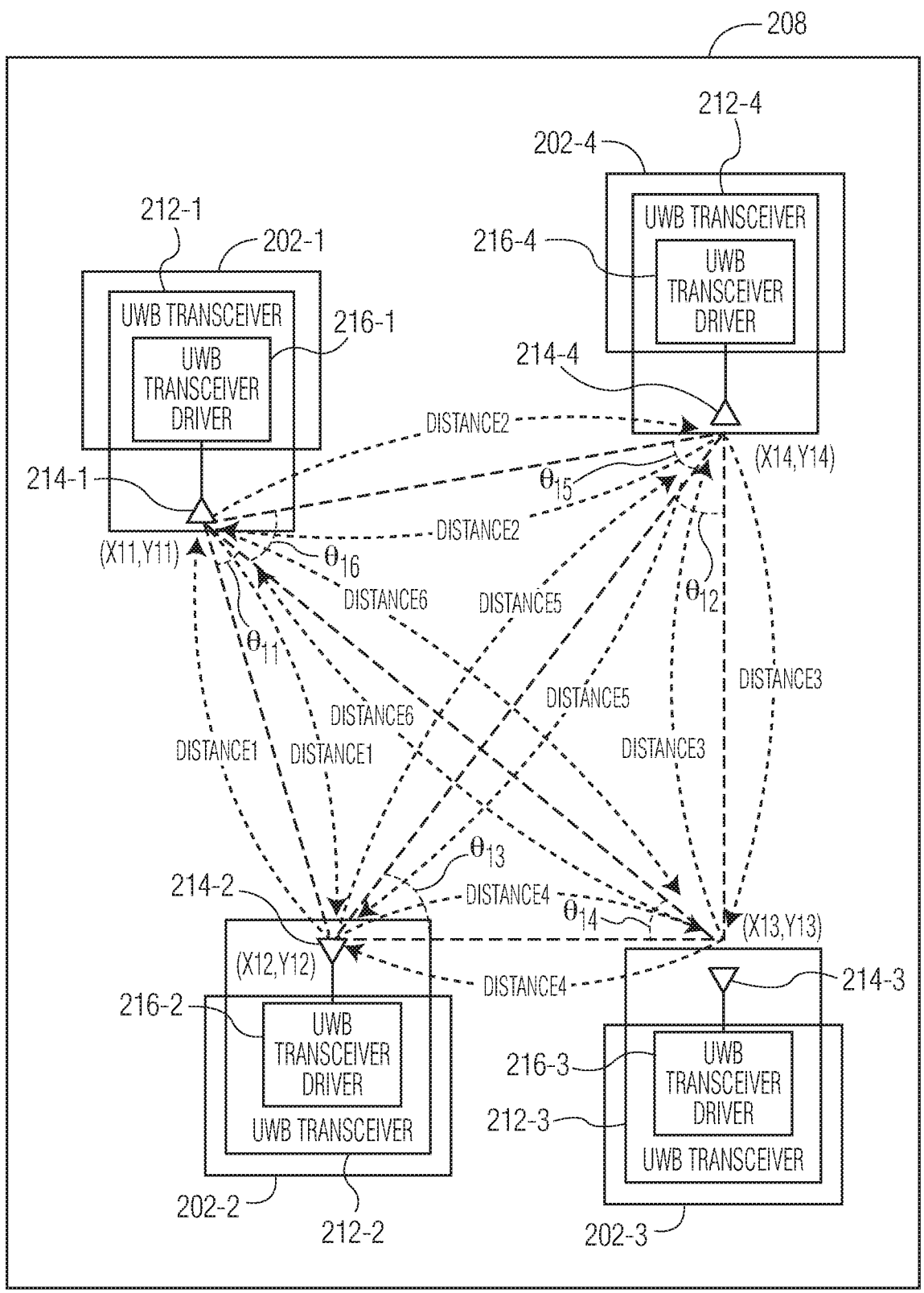
FIG. 2 depicts an embodiment of a UWB beacon mesh network of the communications system depicted in FIG. 1.

FIG. 2 depicts an embodiment of the UWB beacon mesh network 108 of communications system 100 depicted in FIG. 1. In the embodiment depicted in FIG. 2, an UWB beacon mesh network 208 includes beacons 202-1, 202-2, 202-3, 202-4 having a quadrilateral formation. The beacon 202-1 includes an UWB transceiver 212-1, which includes an UWB antenna 214-1 with a coordinate (X11, Y11) and an UWB transceiver driver 216-1. The beacon 202-2 includes an UWB transceiver 212-2, which includes an UWB antenna 214-2 with a coordinate (X12, Y12) and an UWB transceiver driver 216-2. The beacon 202-3 includes an UWB transceiver 212-3, which includes an UWB antenna 214-3 with a coordinate (X13, Y13) and an UWB transceiver driver 216-3. The beacon 202-4 includes an UWB transceiver 212-4, which includes an UWB antenna 214-4 with a coordinate (X14, Y14) and an UWB transceiver driver 216-4. The UWB beacon mesh network 208 depicted in FIG. 2 is one possible embodiment of the UWB beacon mesh network 108 depicted in FIG. 1. Specifically, the beacons 202-1, 202-2, 202-3, 202-4 depicted in FIG. 2 are embodiments of the beacons 102-1, 102-2, 102-3, 102-4 depicted in FIG. 1. However, the UWB beacon mesh network 108 depicted in FIG. 1 is not limited to the embodiment shown in FIG. 2.

In the embodiment depicted in FIG. 2, the beacons 202-1, 202-2, 202-3, 202-4 are self-calibrated such that the network infrastructure configuration of the UWB beacon mesh network 208 is established with geographical location information of at least one of the beacons. Based on UWB time of flight (TOF) and angle of arrival (AoA) information between the beacons, geographical location information of other beacons in the UWB beacon mesh network can be calculated in a calibration operation. In an example calibration operation of the beacons of the UWB beacon mesh network, two-way UWB communications are conducted between the beacons. When one beacon knows its detailed location, such as coordinates of the beacon (e.g., through a geographical tag), and all other beacons can calculate their locations based on two-way communications by measuring distances, distance1, distance2, distance3, distance4, distance5, distance6, between beacons through ToF and angles, θ11, θ12, θ13, θ14, θ15, θ16, between beacons through AoA. In an embodiment, each of the four beacons automatically calibrates by itself. The self-calibration can be performed multiple times to further improve location accuracy. In some instances, GPS, cellular, and/or wireless local area network (WLAN) technology is also used in the beacons to further improve location accuracy. In addition to the UWB transceiver 212-1, 212-2, 212-3, or 212-4, each of the beacons may also include a GPS receiver, a cellular transceiver, and/or a WLAN transceiver.

Figure 3:
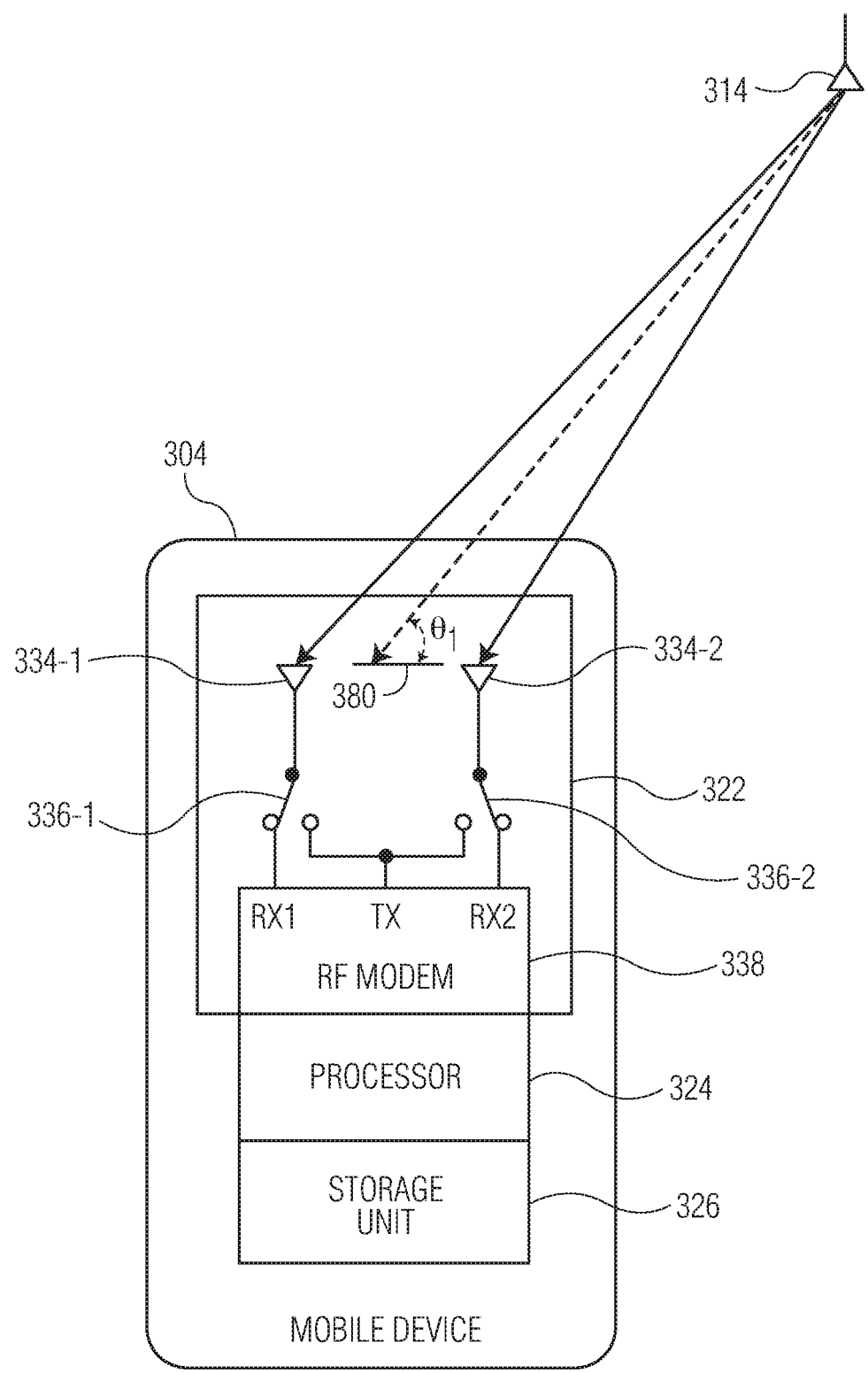
FIG. 3 depicts an embodiment of the mobile device of the communications system depicted in FIG. 1.

FIG. 3 depicts an embodiment of the mobile device 104 of the communications system 100 depicted in FIG. 1. In the embodiment depicted in FIG. 3, a mobile device 304 includes a dual-antenna UWB receiver 322, a processor 324 operably connected to the dual-antenna receiver, and a storage unit 326 for storing location information. The mobile device 304 depicted in FIG. 3 is one possible embodiment of the mobile device 104 depicted in FIG. 1. However, the mobile device 104 depicted in FIG. 1 is not limited to the embodiment shown in FIG. 3. The mobile device may be implemented in hardware, firmware, and/or a combination of hardware, software, and/or firmware.

In the embodiment depicted in FIG. 3, the dual-antenna UWB receiver 322 includes a first UWB antenna 334-1, a second UWB antenna 334-2, an optional first switch 336-1, an optional second switch 336-2, and an RF modem 338 configured to encode UWB signals to be transmitted by the first and second antennas and/or to decode received UWB signals from the first and second antennas. The dual-antenna UWB receiver is configured to receive multiple UWB signals from a group of unsynchronized beacons (e.g., the beacons 102-1, 102-2, 102-3, 102-4 depicted in FIG. 1 or the beacons 202-1, 202-2, 202-3, 202-4 depicted in FIG. 2) having a quadrilateral formation. The first switch 336-1 is configured to switch the first antenna 334-1 between transmitting outgoing UWB signals (TX) and receiving incoming UWB signals (RX1). The second switch 336-2 is configured to switch the second antenna 334-2 between transmitting outgoing UWB signals (TX) and receiving incoming UWB signals (RX2). In some embodiments, the distance between the first UWB antenna and the second UWB antenna is a fraction (e.g., ¼) of the wavelength of the outgoing UWB signal and/or the incoming UWB signal. In some embodiments, the dual-antenna UWB receiver only has the capability of receiving UWB signals and does not include the first and second switches.

In the embodiment depicted in FIG. 3, the processor 324 is configured to determine angle of arrival (AoA) information from the UWB signals and to calculate a location of the mobile device 304 based on the AoA information. In some instances, the AoA information is related to an angle between a respective beacon and the mobile device relative to a reference line (e.g., a horizon line or a vertical line). In some embodiments, the processor is a microcontroller or a central processing unit (CPU). In an example operation of the mobile device 304, an angle θ1 between a beacon (e.g., the beacon 102-1, 102-2, 102-3, or 102-4 of FIG. 1 or the beacon 202-1, 202-2, 202-3, or 202-4 of FIG. 2) and the mobile device relative to a reference horizon line 380 is estimated by the processor from a difference between the time of arrival of a UWB radio pulse from the antenna 314 of the beacon at the first antenna 334-1 of the dual-antenna UWB receiver and the time of arrival of the UWB radio pulse from the antenna 314 of the beacon at the second antenna 334-2 of the dual-antenna UWB receiver.

In the embodiment depicted in FIG. 3, the storage unit 326 is configured to store location information of the mobile device 304. In some embodiments, the storage unit stores a geographical location of the mobile device. The storage unit can be implemented as read only memory (ROM), flash memory, random access memory (RAM), cache, or other type of storage device. Although the illustrated storage unit is shown as being separate from the processor, in some embodiments, the storage unit is implemented within the processor.

Figure 4:
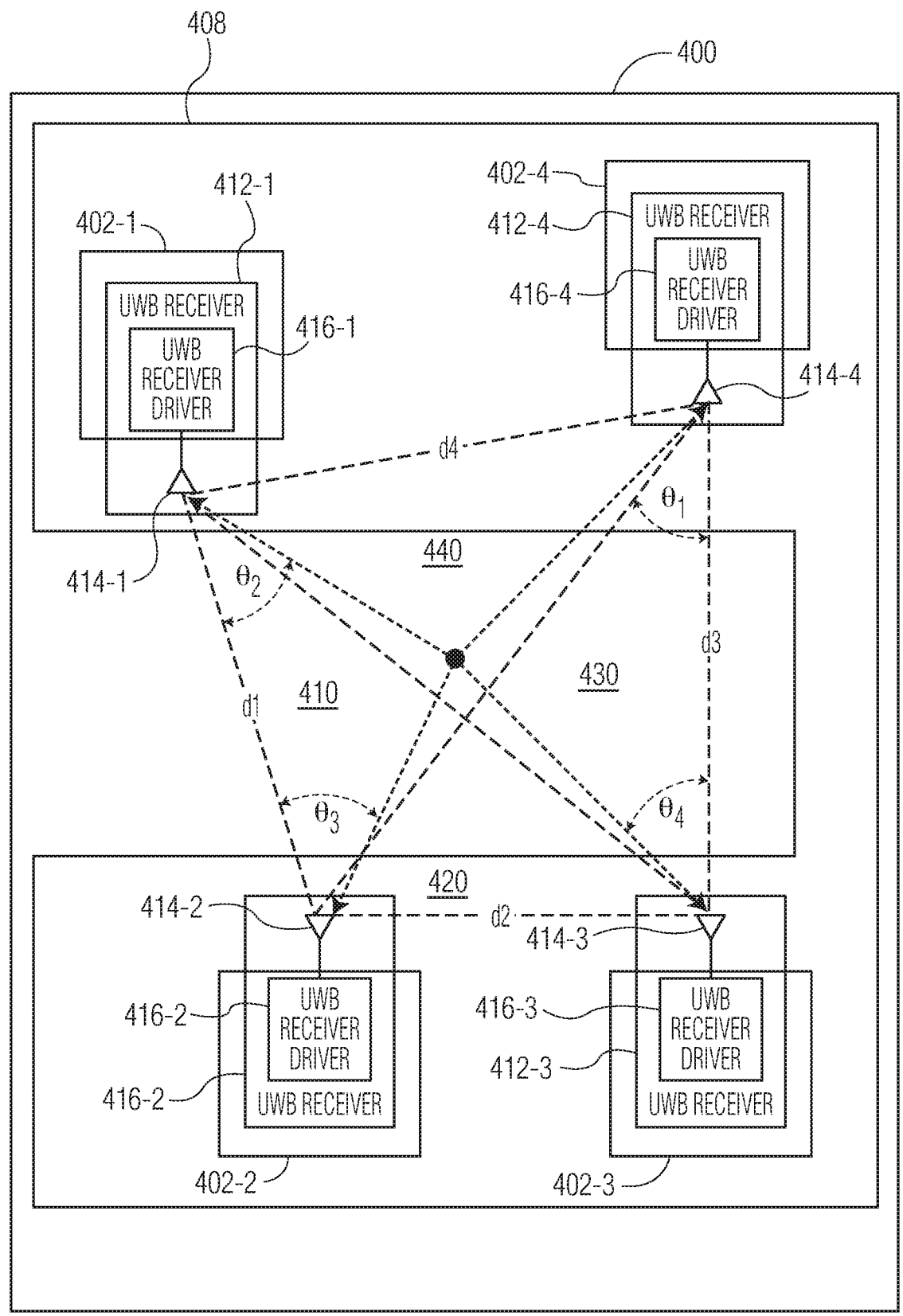
FIG. 4 depicts an embodiment of a communications system in which a location of a mobile device is determined by beacons.

Instead of determining a mobile device location at a mobile device in the embodiments depicted in FIGS. 1-3, in other embodiments, a location of a mobile device is determined by UWB beacons based on one-way UWB communication from the mobile device. FIG. 4 depicts an embodiment of a communications system 400 in which a location of a mobile device 404 is determined by beacons 402-1, 402-2, 402-3, 402-4. In the communications system depicted in FIG. 4, the communications system includes the mobile device 404 and the beacons 402-1, 402-2, 402-3, 402-4 having a quadrilateral formation. The mobile device communicates with the beacons via UWB communications. The mobile device location can be determined by the beacons with one-way UWB communication from the mobile device to the beacons based on angle of arrival (AoA) information. Although the communications system in the embodiment depicted in FIG. 4 includes four beacons 402-1, 402-2, 402-3, 402-4, in other embodiments, the communications system include more than four beacons or less than four beacons.

In the embodiment depicted in FIG. 4, the beacons 402-1, 402-2, 402-3, 402-4 form an UWB beacon mesh network 408. The beacon 402-1 includes an UWB receiver 412-1, which includes an UWB antenna 414-1 and an UWB receiver driver 416-1. The beacon 402-2 includes an UWB receiver 412-2, which includes an UWB antenna 414-2 and an UWB receiver driver 416-1. The beacon 402-3 includes an UWB receiver 412-3, which includes an UWB antenna 414-3 and an UWB receiver driver 416-2. The beacon 402-4 includes an UWB receiver 412-4, which includes an UWB antenna 414-4 and an UWB receiver driver 416-4. The beacons are unsynchronized because the UWB beacon mesh network does not require clock synchronization among the beacons. In some embodiments, the beacons are self-calibrated such that network infrastructure configuration of the UWB beacon mesh network is established with geographical location information of at least one of the beacons. Because the beacons have a quadrilateral formation, geographical location information of other beacons can be derived from the geographical location information of at least one of the beacons and from the triangle relationship between the beacons.

In the embodiment depicted in FIG. 4, the unsynchronized beacons 402-1, 402-2, 402-3, 402-4 are configured to determine a location of the mobile device 404 based on UWB signals received from the mobile device 404. In an example operation of the beacons, the beacons receive UWB signals from the mobile device, determine angle of arrival (AoA) information from the UWB signals, and calculate the location of the mobile device based on the AoA information. In some instances, AOA information is aggregated at a particular beacon and the location of the mobile device is calculated at the particular beacon based on the AoA information. In some instances, a first location of the mobile device is determined at a first beacon based on the AoA information, a second location of the mobile device is determined at a second beacon based on the AoA information, and an average location is calculated based on the first and second locations. The mobile device may have a wide range of mobility and portability. For example, the mobile device may be in the possession of a pedestrian, which has a pedestrian speed that is typically below 20 Km/h. In an embodiment, the mobile device is a handheld mobile device such as a cellular phone, a Smartphone, a PDA, an EDA, a handheld gaming device, or a wearable device. In another embodiment, the mobile device is a portable computing device such as a laptop computer, a netbook computer, or a tablet computer.

In an example operation of the communications system 100, the unsynchronized beacons 402-1, 402-2, 402-3, 402-4 determine a position of the mobile device from UWB signals from the mobile device 404. Specifically, the beacons determine four angles θ1, θ2, θ3, θ4, between respective beacons and the mobile device and collaboratively calculates the location of the mobile device based on the angles θ1, θ2, θ3, θ4. The beacons may determine the location of the mobile device by triangulation. For example, the beacons and the mobile device form four triangles 410, 420, 430, 440. For each triangle, the locations of the two respective beacons and the distance d1, d2, d3, or d4 between the two respective beacons is known to at least one of the beacons and the angle between the two respective beacons and the mobile device is determined by a respective beacon. Because the beacons use the four triangles to determine the location of the mobile device, the overall location accuracy of the mobile device can be improved by averaging location coordinates. In addition, because the beacons use the four triangles to determine the location of the mobile device, mirror position problem can be eliminated. In some instances, the beacons send the determined location information of the mobile device back to the mobile device, which can verify the location accuracy.

Figure 5:
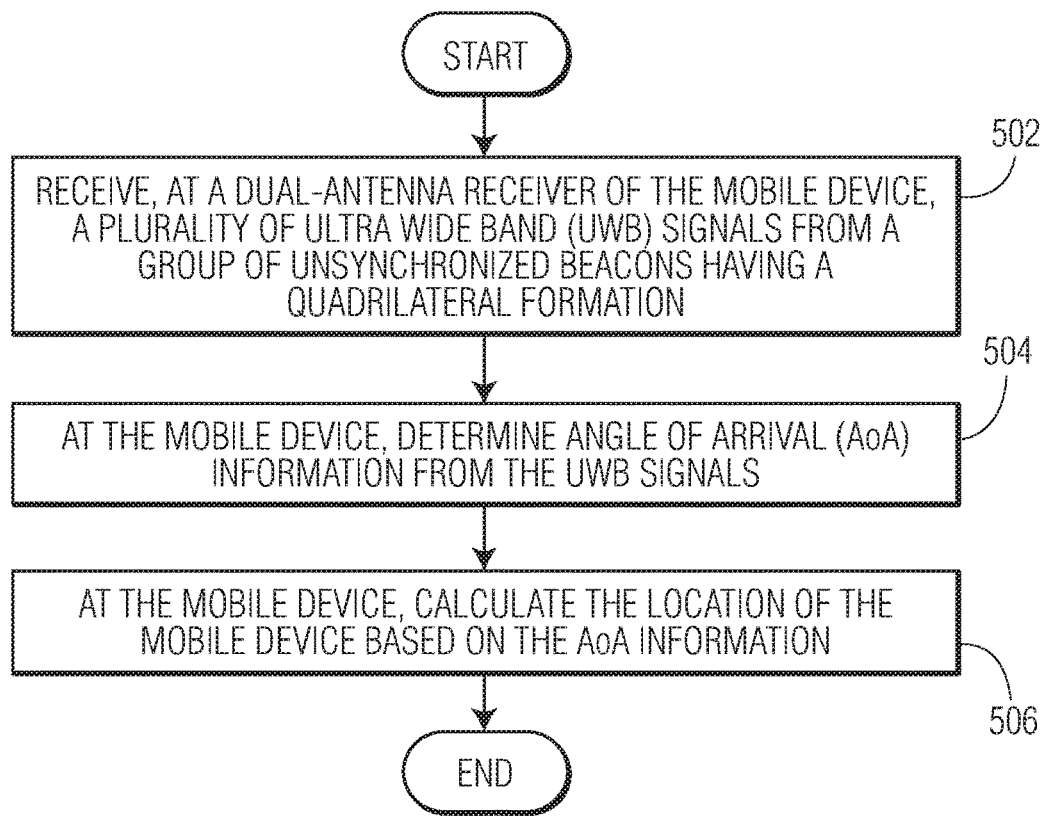
FIG. 5 is a process flow diagram of a method for determining a location of a mobile device in accordance with an embodiment of the invention.

FIG. 5 is a process flow diagram of a method for determining a location of a mobile device in accordance with an embodiment of the invention. At block 502, ultra wide band (UWB) signals from a group of unsynchronized beacons having a quadrilateral formation are received at a dual-antenna receiver of the mobile device. At block 504, at the mobile device, angle of arrival (AoA) information is determined from the UWB signals. At block 506, at the mobile device, the location of the mobile device is calculated based on the AoA information. The mobile device may be the same or similar to the mobile device 104 depicted in FIG. 1.

Figure 6:
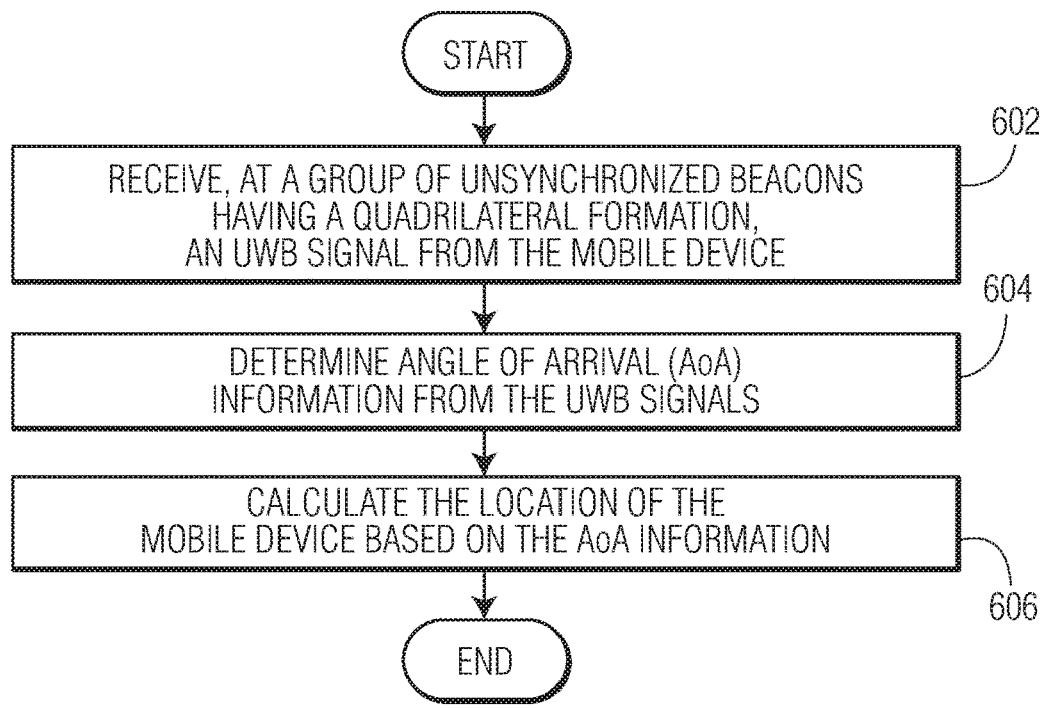
FIG. 6 is a process flow diagram of a method for determining a location of a mobile device in accordance with another embodiment of the invention.

FIG. 6 is a process flow diagram of a method for determining a location of a mobile device in accordance with another embodiment of the invention. At block 602, an UWB signal from the mobile device is received at a group of unsynchronized beacons. At block 604, angle of arrival (AoA) information is determined from the UWB signals. At block 606, the location of the mobile device is calculated based on the AoA information. The mobile device may be the same or similar to the mobile device 404 depicted in FIG. 4.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for determining a location of a mobile device, the method comprising:
   receiving, at a dual-antenna receiver of the mobile device, a plurality of ultra wide band (UWB) signals from a group of unsynchronized beacons having a quadrilateral formation;
   at the mobile device, determining angle of arrival (AoA) information from the UWB signals; and
   at the mobile device, calculating the location of the mobile device based on the AoA information, locations of at least two respective beacons of the unsynchronized beacons, and distances between the at least two respective beacons of the unsynchronized beacons, wherein the locations of the at least two respective beacons and the distances between the at least two respective beacons are known to the mobile device.

2. The method of claim 1, wherein the group of unsynchronized beacons comprises at least four beacons that are not clock synchronized.

3. The method of claim 1, wherein determining the AoA information from the UWB signals comprises estimating an angle between each of the group of unsynchronized beacons and the mobile device.

4. The method of claim 3, wherein estimating the angle between each of the group of unsynchronized beacons and the mobile device comprises estimating the angle between each of the group of unsynchronized beacons and the mobile device based on a difference between a time of arrival of the UWB signals at a first antenna of the dual-antenna receiver and a time of arrival of the UWB signals at a second antenna of the dual-antenna receiver.

5. The method of claim 3, wherein calculating the location of the mobile device based on the AoA information comprises calculating the location of the mobile device based on the angles between the group of unsynchronized beacons and the mobile device.

6. The method of claim 3, wherein the group of unsynchronized beacons comprises four beacons that are not clock synchronized, and wherein calculating the location of the mobile device based on the AoA information comprises calculating the location of the mobile device based on four angles between the group of unsynchronized beacons and the mobile device.

7. A mobile device, the mobile device comprising:
   a dual-antenna ultra wide band (UWB) receiver configured to receive a plurality of UWB signals from a group of unsynchronized beacons having a quadrilateral formation;
   a processor operably connected to the dual-antenna UWB receiver, wherein the processor is configured to:
      determine angle of arrival (AoA) information from the UWB signals; and
      calculate a location of the mobile device based on the AoA information, locations of at least two respective beacons of the unsynchronized beacons, and distances between the at least two respective beacons of the unsynchronized beacons, wherein the locations of the at least two respective beacons and the distances between the at least two respective beacons are known to the mobile device.

8. The mobile device of claim 7, wherein the group of unsynchronized beacons comprises at least four beacons that are not clock synchronized, and wherein the processor is further configured to estimate an angle between each of the group of unsynchronized beacons and the mobile device.

9. The mobile device of claim 7, wherein the dual-antenna UWB receiver comprises a first antenna and a second antenna.

10. The mobile device of claim 9, wherein the processor is further configured to estimate the angle between each of the group of unsynchronized beacons and the mobile device based on a difference between a time of arrival of the UWB signals at the first antenna and a time of arrival of the UWB signals at the second antenna.

11. The mobile device of claim 9, wherein the processor is further configured to calculate the location of the mobile device based on the angles between the group of unsynchronized beacons and the mobile device.

12. The mobile device of claim 9, wherein the group of unsynchronized beacons comprises four beacons that are not clock synchronized, and wherein the processor is further configured to calculate the location of the mobile device based on four angles between the group of unsynchronized beacons and the mobile device.

13. A method for determining a location of a mobile device, the method comprising:
receiving, at a group of unsynchronized beacons having a quadrilateral formation, an ultra wide band (UWB) signal from the mobile device;
at the group of unsynchronized beacons, determining angle of arrival (AoA) information from the UWB signal; and
at the group of unsynchronized beacons, calculating the location of the mobile device based on the AoA information, locations of the unsynchronized beacons, and distances between at least two respective beacons of the unsynchronized beacons, wherein the locations of the at least two respective beacons and the distance between the at least two respective beacons are determined by a respective beacon.

14. The method of claim 13, wherein the group of unsynchronized beacons comprises at least four beacons that are not clock synchronized.

15. The method of claim 13, wherein determining the AoA information from the UWB signals comprises estimating an angle between each of the group of unsynchronized beacons and the mobile device.

16. The method of claim 15, wherein calculating the location of the mobile device based on the AoA information comprises calculating the location of the mobile device based on the angles between the group of unsynchronized beacons and the mobile device and geographical information of the group of unsynchronized beacons.

17. The method of claim 13, wherein the group of unsynchronized beacons determines angles between the at least two respective beacons and collaboratively calculates the location of the mobile device based, at least in part, on the angles.

18. The method of claim 13, wherein the AoA information is aggregated at a particular beacon of the group of unsynchronized beacons and the location of the mobile device is calculated at the particular beacon based on the AoA information.

19. The method of claim 13, wherein a first location of the mobile device is determined by a first beacon and a second location of the mobile device is determined by a second beacon, and an average location of the mobile device is calculated based on first and second locations.

* * * * *